United States Patent
Zhou et al.

[11] Patent Number: 6,112,372
[45] Date of Patent: *Sep. 5, 2000

[54] POT HOLDER

[76] Inventors: Zeng-Nan Zhou; Yi-Kang Shen, both of 12774 Westeria Dr., Germantown, Md. 20874

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,753

[22] Filed: Oct. 29, 1997

[51] Int. Cl.⁷ ............................................. A47B 95/02
[52] U.S. Cl. ........................ 16/435; 16/431; 16/DIG. 12
[58] Field of Search ......................... 16/116 A, 116 R, 16/DIG. 12; 294/25; 2/20, 158–160; 38/95

[56] References Cited

U.S. PATENT DOCUMENTS

| | | | |
|---|---|---|---|
| 580,148 | 4/1897 | Staples | 16/116 A |
| 701,305 | 6/1902 | Daughtry | 16/116 A |
| 1,637,120 | 7/1927 | Larson | 38/95 |
| 2,042,255 | 5/1936 | Haas | 15/210 |
| 2,047,635 | 7/1936 | Johst | 16/116 |
| 2,261,064 | 10/1941 | Katz | 16/116 A |
| 2,306,062 | 12/1942 | Katz | 16/116 A |
| 2,324,226 | 7/1943 | Murphy | 38/95 |
| 2,641,793 | 6/1953 | Wilm | 16/116 A |
| 2,727,238 | 12/1955 | Silver | 2/20 |
| 2,905,946 | 9/1959 | Goldsmith | 16/116 A |
| 4,001,904 | 1/1977 | Gill | 7/14.6 |
| 4,201,795 | 5/1980 | Yamanaka | 426/110 |
| 4,388,743 | 6/1983 | Hellinger et al. | 16/116 A |

*Primary Examiner*—Chuck Y. Mah

[57] ABSTRACT

The present invention relates generally to a pot holder, which comprises at least two panels each being defined by an edge portion. Each panel has an outer layer, an inner layer and a heat insulating filling member sandwiched between the outer layer and the inner layer. The outer layer, the filling member and the inner layer of each panel are connected to one another along at least part of its edge portion. The pot holder of the present invention further comprises a joining member which continuously connects the panels along at least part of their edge portions to form a pocket portion therebetween. The pocket portion has an opening portion defined by the remaining edge portions of the panels. The pot holder of the present invention provides an easy, direct and effective way for protecting a user's hands and fingers from being burned. In addition, the pot holder of the present invention is simple and inexpensive to manufacture, and can be of excellent artistic flavor.

13 Claims, 7 Drawing Sheets

POT HOLDER

FIELD OF THE INVENTION

The present invention relates generally to a pot holder. In particular, the present invention relates to a pot holder for holding handles and/or lid knobs of cooking utensils that provides an easy, direct and effective way for protecting a user's hands and fingers from being burned while touching or holding hot handles or lid knobs of such cooking utensils.

BACKGROUND OF THE INVENTION

Ovenmitts, dish holders and pot holders are most commonly used for holding hot pot handles or lid knobs when handling kitchen utensils during cooking. As ovenmitts are usually big and clumsy, they usually require more time and need help from the other hand to put on. On the other hand, dish/pot holders do not usually cover the area to be held very well and can easily slip. It is thus very likely that hands or fingers are burned when not carefully using such ovenmitts or dish/pot holders. Hence, neither ovenmitts nor dish/pot holders provides safe and convenient handling of kitchen utensils.

Moreover, due to the excessive size of ovenmitts and dish/pot holders, they themselves can get burned when being used. In addition, both ovenmitts and dish holders can be too big not to touch the food contained in the utensil. Hence, they can potentially contaminate the food.

The following U.S. patents concern various dish/pot holders:

U.S. Pat. No. 4,388,743 issued to Hellinger et al. discloses a lid handle cover;

U.S. Pat. No. 4,201,795 issued to Yamanaka discloses a handy container-pan for instantly frizzlable dry foods;

U.S. Pat. No. 4,001,904 issued to Gill discloses a kitchen utensil molded of rubber or flexible synthetic plastic;

U.S. Pat. No. 2,727,238 issued to Silver discloses a pot holder device;

U.S. Pat. No. 2,047,635 issued to Johst discloses a hand holder; and

U.S. Pat. No. 2,042,255 issued to Haas discloses a holder and wiper.

However, none of the above U.S. patents is effective for protecting a user's hands and fingers during cooking process, especially in the situation when it needs to quickly lift a pot lid, quickly move a pot from a stove, or hold a pot handle or lid knob with one hand while cooking with the other hand.

Therefore, it is desirable to provide a pot holder which can effectively protect a user from being burned and is easy and convenient to use, and simple and inexpensive to manufacture. The present invention provides a pot holder which meets these requirements.

SUMMARY OF THE INVENTION

The present invention relates to a heat insulating pot holder which can be used for holding handles or lid knobs of a kitchen utensil such as a pot. The heat insulating pot holder can be sleeved onto or taken off from pot handles or lid knobs to thereby provide an easy and effective protection for the user when handling hot pot handles and/or lids.

The pot holder of the present invention comprises at least two panels each being defined by an edge portion. Each panel has an outer layer, an inner layer and a heat insulating filling member sandwiched between the outer layer and the inner layer. The outer layer, the filling member and the inner layer of each panel are connected to one another along at least part of its edge portion. The pot holder of the present invention further comprises a joining member which continuously connects the panels along at least part of their edge portions to form a pocket portion therebetween. The pocket portion has an opening portion defined by the remaining edge portions of the panels.

The pocket portion, defined by at least portions of the panels and the joining member, is adapted to accommodate a pot handle or a lid knob. The pocket portion is preferably sized substantially the same as a pot handle or a lid knob so that the pot holder can effectively cover the hot area on the pot handle or lid knob. The opening portion of the pocket portion is so dimensioned that the pot holder can be easily sleeved onto and taken off from a pot handle or a lid knob.

In a preferred embodiment of the present invention, the pot holder comprises first and second panels each being defined by a first edge portion and a second edge portion.

Each of the two panels has an outer layer, an inner layer and a heat insulating filling member located between the outer layer and the inner layer. The outer layer, the filling member and the inner layer are connected to one another along at least part of the first and the second edge portions. The pot holder further comprises a joining member connecting the first and second panels along their first edge portions to form a pocket portion having an opening portion. The joining member is preferably a continuous seam member.

In a preferred embodiment, the second edge portions of the two panels can be curved. In addition, the second edge portion of the second panel can extend beyond that of the first panel.

In an alternative embodiment of the present invention, the two panels of the pot holder constitutes an integral pad member. The joining member comprises a folding portion of the integral piece and a seam member continuing from the folding portion.

The present invention also relates to a pot holder which comprises a pad member defined by an edge portion. The pad member has an outer layer, an inner layer and a heat insulating filling member sandwiched between the outer layer and the inner layer. The outer layer, the filling member and the inner layer are connected to one another at least along the edge portion. The pad member is folded up into two panels along a folding line which is terminated at two ends. The pot holder further comprises a joining seam connecting the two panels along at least a portion of the edge portion and continuing from at least one end of the folding line to form a pocket portion having an opening portion. The pocket portion is defined by at least portions of the two panels and the joining member and is adapted to accommodate a pot handle or a lid knob.

According to the present invention, the joining member can continue from both ends of the folding line. In addition, the two panels can have the same shape, such a semicircular or a rectangular shape.

In a further preferred embodiment, the pot holder is made to have a three dimensional design. More specifically, the pot holder is formed by either rolling or folding an integral pad member or multiple panels into a desired shape. The pot holder so formed can have an enlarged pocket portion and opening portion.

Various heat resistant, fire-proof and fire resistant materials can be used to make the pot holder of the present invention and, particularly, its inner and outer layers and filling member. At least one of the outer and inner layers is made of heat resistent materials to protect the user from being burned during normal use. In a preferred embodiment, the inner layer is made of heat resistent materials, such as cotton or other flexible material with a heat resistant coating. The outer layer can be made of a flexible material having a decorative pattern for aesthetic purposes. The filling member can be various heat insulating materials such as cotton batting.

The pot holder of the present invention can further comprise a hanging member attached thereon. The hanging member can made of the same material as that of the outer layers. In a preferred embodiment, the hanging member is made of heat resistent materials.

The present invention further relates to, in combination with a kitchen utensil having a handle and/or a lid knob, a pot holder as described hereinabove.

BRIEF DESCRIPTION OF THE DRAWINGS

These and other features, aspects, and advantages of the present invention will become much more apparent from the following description, appended claims, and accompanying drawings, in which:

DETAILED DESCRIPTION OF THE PREFERRED EMBODIMENTS

Various pot holders embodying the principles of the present invention are illustrated in FIGS. 1–7. These pot holders provides an easy, direct, and effective way of holding hot handles and lid knobs of kitchen utensils, such as pots. In each embodiment, the same elements are designated with the same reference numerals and repetitive descriptions are omitted.

Figure 1A:
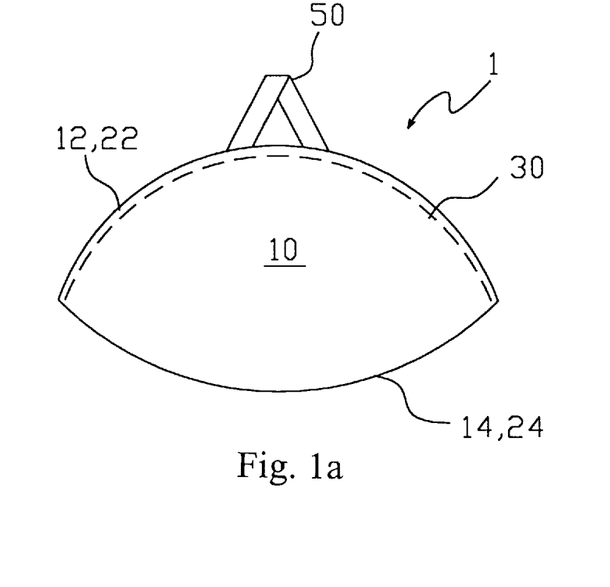
FIGS. 1a to 1c show front, top and side views of the pot holder according to the present invention.
Figure 1B:
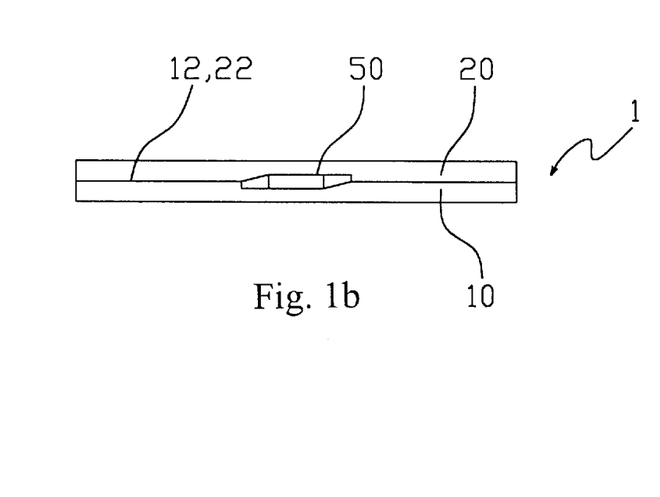
Figure 1C:
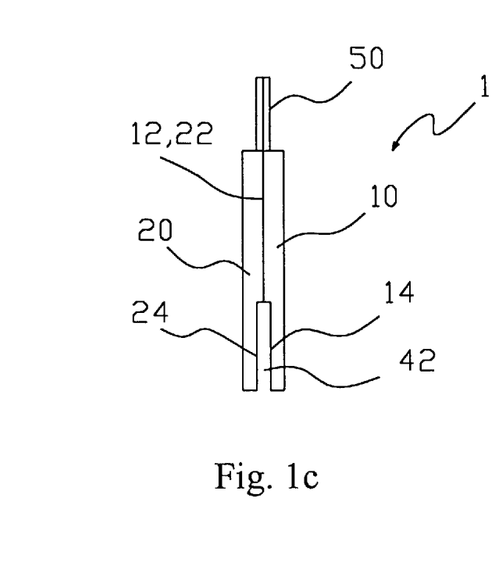

Referring to the FIGS. 1a to 1c, the pot holder of the present invention is generally designated by numeral reference 1. The pot holder 1 can comprise first and second panels 10 and 20 connected to each other. The pot holder 1 thus formed can have a flat shape, or other geometric shapes with artistic designs (see FIGS. 2a and 3e). In a preferred embodiment of the present invention, the first and the second panels 10 and 20 are made to be the same. In order to simplify the descriptions, reference will now only be made to the first panel 10, which is also applicable for the second panel 20.

The first panel 10 of the pot holder 1 is defined by a first edge portion 12 and a second edge portion 14. In other words, the edge portions 12 and 14 determines the shape of the first panel 10. The first panel 10 can be made in various shapes, such as semicircular, rectangular or animated shapes.

Figure 2A:
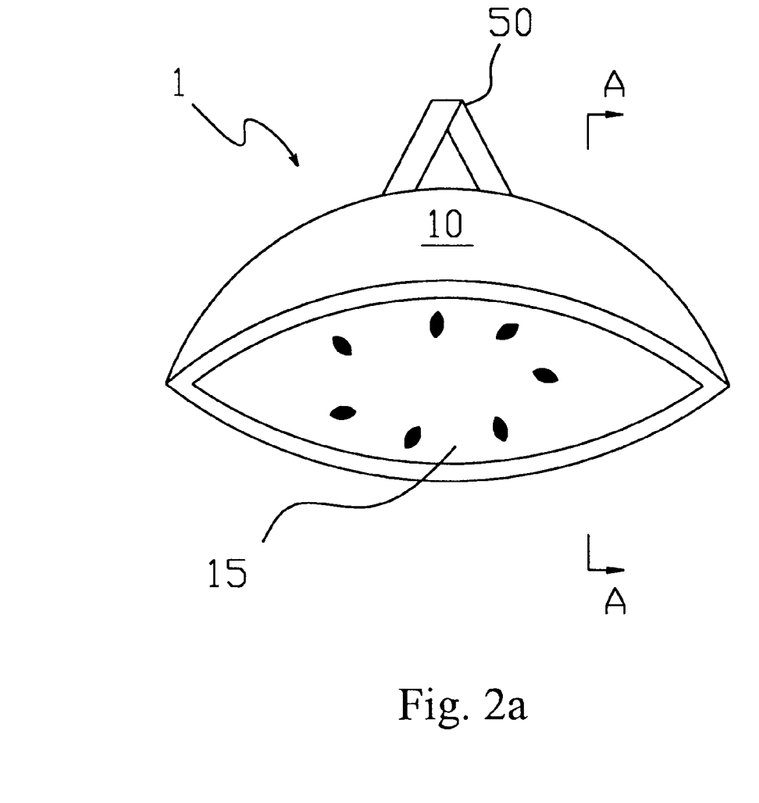
FIGS. 2a–2b shows the front view and the cross-section of an alternative embodiment of the present invention.
Figure 2B:
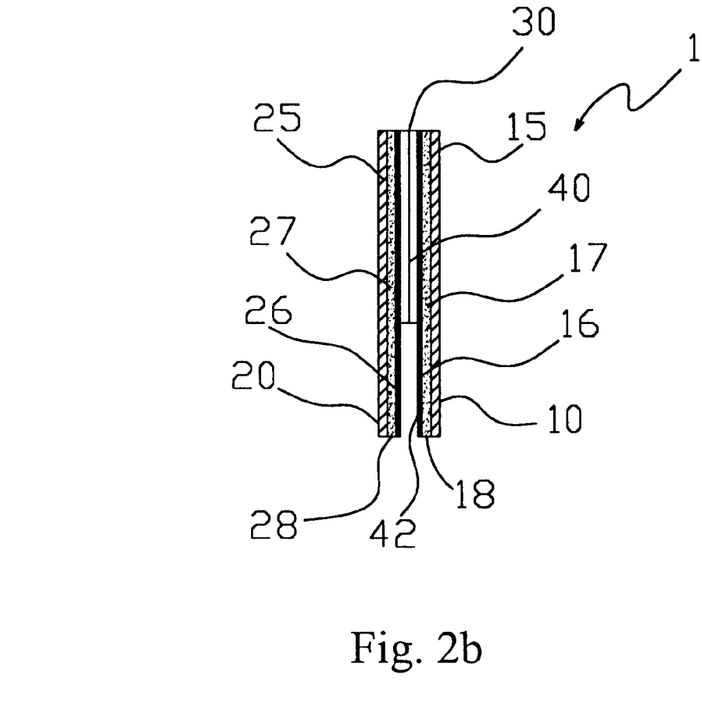

As further illustrated in FIG. 2b, the first panel 10 has an outer layer 15, an inner layer 16 and a heat insulating filling member 17 located between the outer layer 15 and the inner layer 16. The outer layer 15, the filling member 17 and the inner layer 16 are connected to one another at least along the edge portions 12 and 14 of the first panel 10 by conventional means such as sewing and adhesion. In a preferred embodiment, a stitch seam 18 is provided, at least, along the second edge portion 14 of the first panel 10 to connect the layers 15 and 16 and the filling member 17. In another preferred embodiment, the first panel 10 is further quilted (not shown).

The first and second panels 10 and 20 are connected to each other along their first edge portions 12 and 22 through a joining member 30. It is preferred that the two panels 10 and 20 are fixedly connected to each other. In a preferred embodiment, the joining member 30 is in the form of a continuous stitch seam. A pocket portion 40 (see FIG. 2b) is thereby defined by at least portions of the panels 10 and 20 together with the joining member 30 and is adapted to accommodate a pot handle (see FIG. 6). The pocket portion 40 is preferably sized substantially the same as a pot handle so that it can fitly cover the pot handle. In addition, the pocket portion 40 has an opening portion 42 defined by the second edge portions 14 and 24 of the two panels 10 and 20. The opening portion 42 is adapted to receive the pot handle when the pot holder 1 fits thereunto.

The pot holder 1 of the present invention can be made of various materials such as heat resistant, fire proof and fire resistant materials. Thereby, the user can be protected from being burned when using such a pot holder 1. In an embodiment, at least one of the outer layer 15 and the inner layer 16 is made of heat resistent materials or any other suitable materials with heat resistent, fire retardant or fire proof treatment. In a preferred embodiment, the inner layer 16 is made of heat resistent materials, such as cotton or other flexible material with a heat resistant coating. The outer layer 15 can be made of a flexible material having a decorative pattern, such as a cut water melon, (see FIGS. 2a and 3e) for aesthetic purposes. The outer layer 15 and the inner layer 16 of the pot holder 1 can also be made of the same material. The filling member 17 can be made of various heat insulating materials such as cotton batting.

The pot holder 1 can further have a hanging member 50 attached thereon for hanging the pot holder 1. The hanging member 50 can be made of various heat resistent, fire retardant, or fire proof materials such as quartz, ceramics, clays. In a preferred embodiment, the hanging member 50 is made of the same material as that of the outer layers 15 and 25 of the pot holder 1.

Figure 3A:
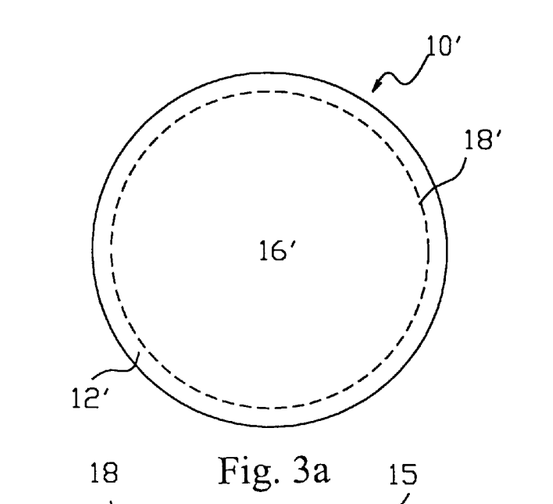
FIGS. 3a and 3b are front and side views of a pad member used for making the pot holder of the present invention and FIGS. 3c to 3e show a pot holder made of the pad member shown in FIGS. 3a and 3b.
Figures 3B, 3E:
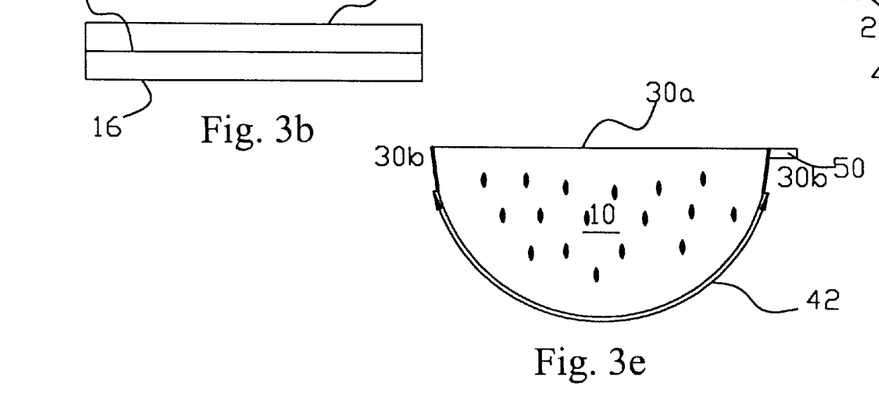

In an alternative embodiment as shown in FIGS. 3a and 3e, the two panels 10 and 20 of the pot holder 1 is formed of a pad member 10' of an integral piece. The integral pad member 10' is defined by an edge portion 12' and can be of various shapes such as circular, oval and rectangular shapes. Such an integral pad member 10' has a similar layer structure as that of the two panels 10 and 20 in the previous embodiment. FIG. 3a shows the inner layer 16' of the integral pad member 10' and a stitch seam 18' provided along the edge portion 12'. The stitch seam 18' connects the outer layer, the filling member (both hidden behind the inner layer 16' in FIG. 3a) and the inner layer 16' of the pad member 10'.

Figure 3C:
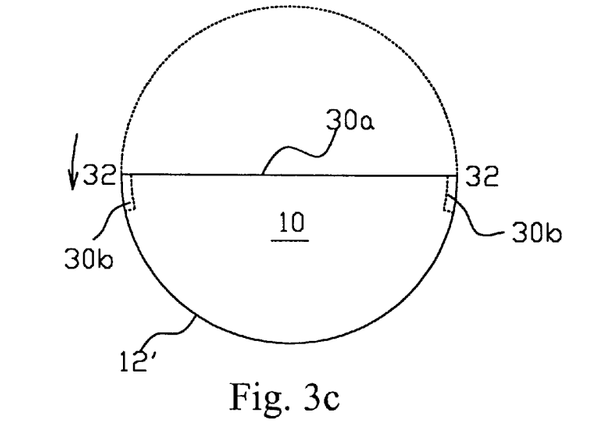
Figure 3D:
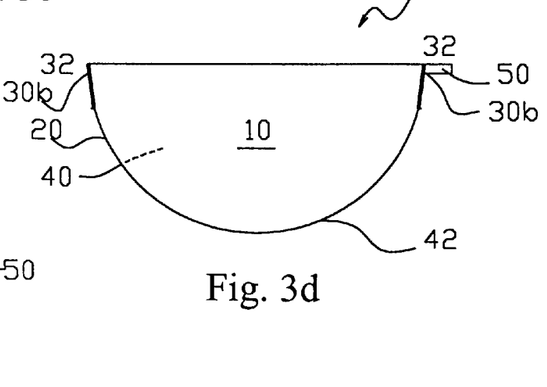

The pad member 10' can be folded up into two panels 10 and 20 along a folding line 30a as shown in FIGS. 3c to 3e. A joining seam 30b is further provided to connect the two panels 10 and 20 along a portion of the edge portion 12' (FIG. 3c). It is preferred that the joining seam 30b continues from at least one end 32 of the folding line 30a. Thereby, the folding line 30a and the joining seam 30b constitute a joining member 30, similar to that in the previous embodiment. In a preferred embodiment, the joining seam 30b can continue from both ends 32 of the folding line 30b. The joining seams 30b, however, discontinue to form an opening portion 42 (FIG. 3e). A pocket portion 40 is thus defined by at least portions of the two panels 10 and 20 and the joining member 30a and 30b.

The two panels 10 and 20, as shown in FIGS. 1–3, are designed to have the same shape, such as a semicircular shape, a rectangular shape or an animated shape. It is understood that the same design of the two panels 10 and 20 can, among other advantages, simplify the making of such pot holder 1.

Figure 4A:
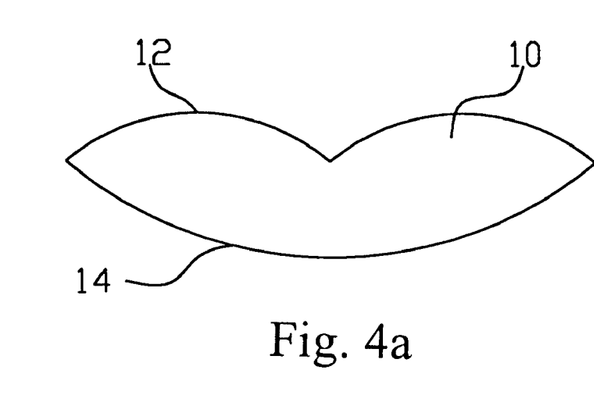
FIGS. 4a to 4c show front and rear panels and a pot holder made of the panels, respectively.
Figure 4B:
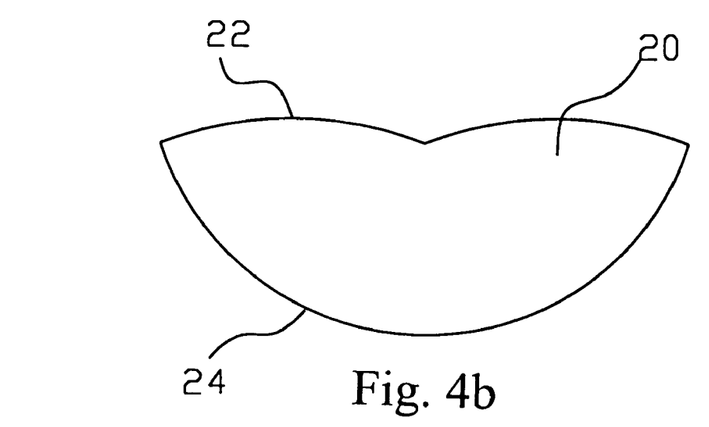
Figure 4C:
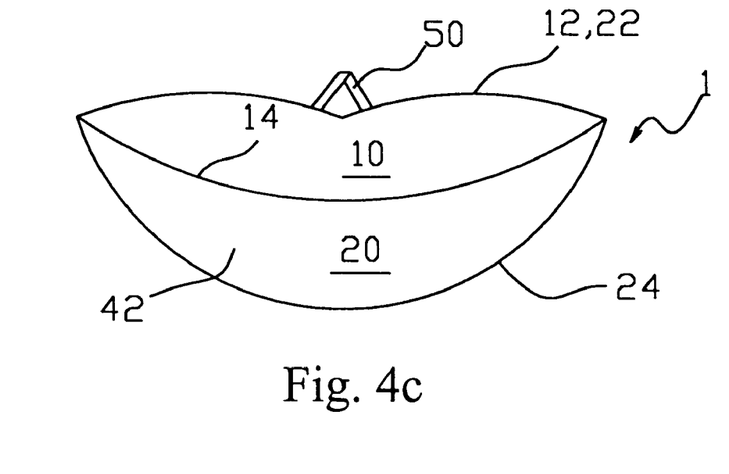

In another preferred embodiment as shown in FIGS. 4a to 4c, the first and second panels 10 and 20 have different shapes. More specifically, the second edge portion 24 of the second panel 20 can extend beyond that of the first panel 10 or vice versa. Thereby, the opening portion 42 of the pot holder 1 is stepped for an easier fitting onto a pot handle or lid knob. Moreover, the first panel 10 and the second panel 20 are constituted to resemble the shapes of an upper lip and a lower lip respectively. Such a design demonstrates one of the many animated configurations the pot holder 1 can be shaped like.

It is also preferred that at least one of the second edge portions 14 and 24 of the two panels 10 and 20 is curved. One main advantage of such a curved second edge portion 14 and/or 24 is to facilitate the user to open the pocket portion 40 and then sleeve the same onto a pot handle or a lid knob, as shown in FIGS. 6 and 7.

Figure 5A:
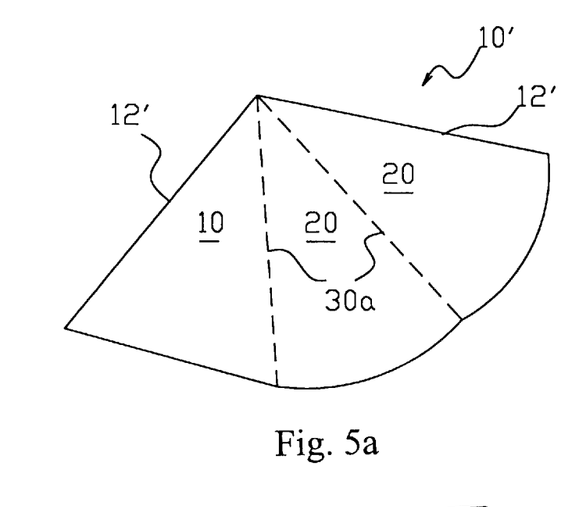
FIGS. 5a to 5d show another preferred embodiment of the present invention which utilizes multiple panels.
Figure 5B:
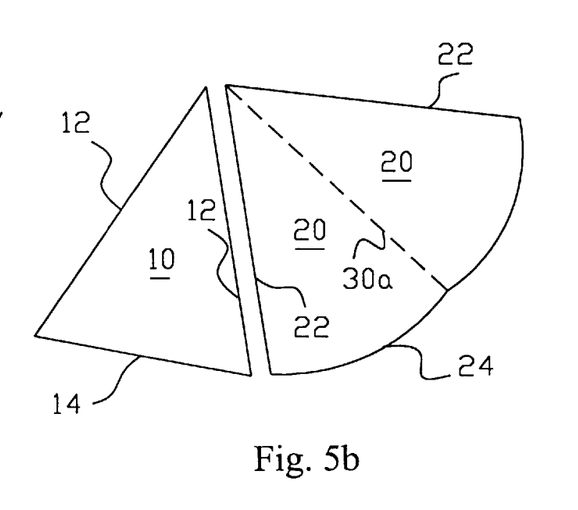
Figure 5C:
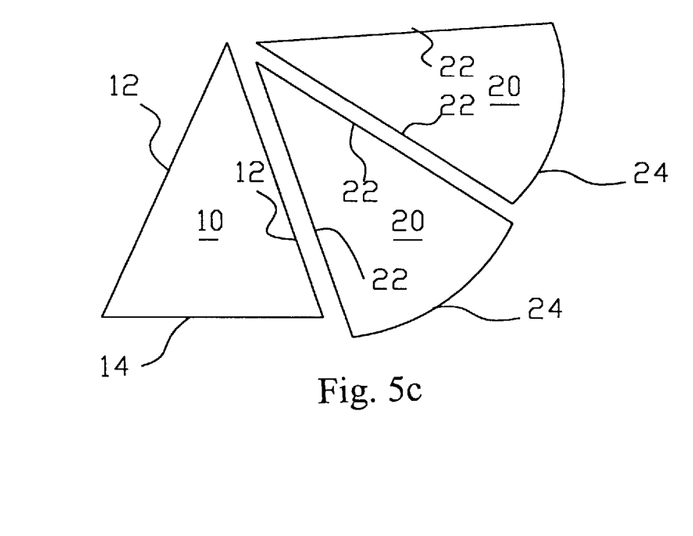
Figure 5D:
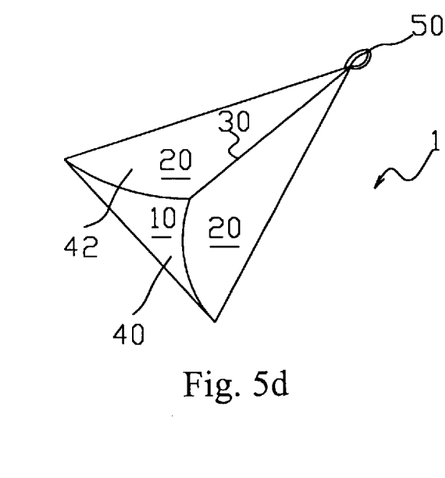

FIGS. 5a to 5d show another preferred embodiment of the present invention which includes multiple panels 10 having a triangular shape and 20 having two lateral edge portions 22 and a curved edge 14. Each of the multiple panels 10 and 20 has a similar structure to that of the first panel 10 as described above. These multiple panels 10 and 20 can be integrated as a pad member 10' as shown in FIG. 5a or be separate panels 10 and 20 as shown in FIGS. 5b and 5c. The pad member 10' or the multiple panels 10 and 20 can be rolled or folded to form a pot holder 1 of a desired shape as shown in FIG. 5d. The pot holder 1 thus formed can have a larger pocket portion 40 and opening portion 42 so that it is easier for the user to sleeve the pot holder 1 onto a pot handle or a lid knob. According to this embodiment, the pot holder 1 is made to have a three dimensional design.

Figure 6:
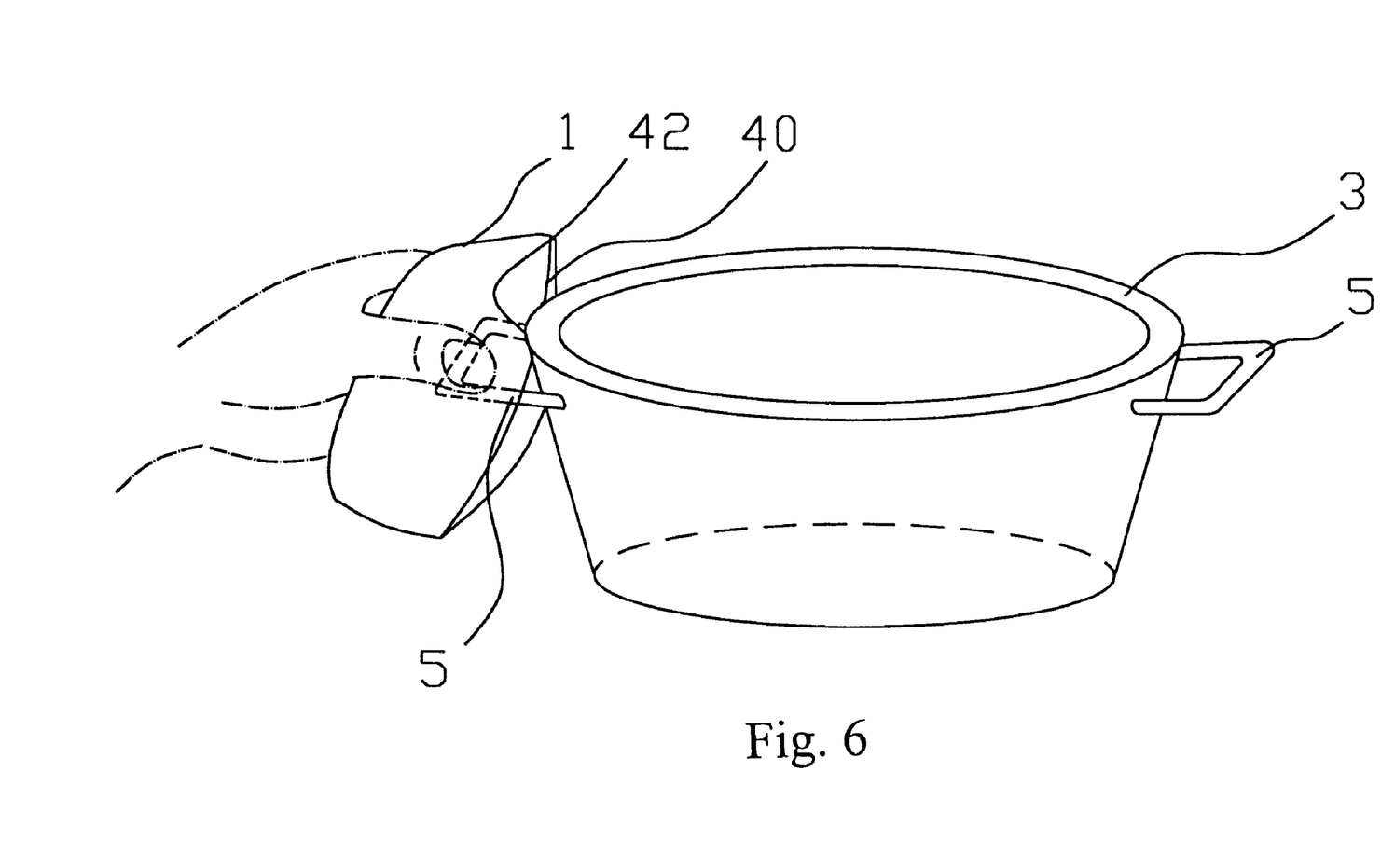
FIG. 6 shows the pot holder in FIGS. 3c to 3e being used in connection with a pot handle.

FIG. 6 shows that the pot holder 1 is used in connection with a kitchen utensil 3 having handles 5. The pot holder 1 can be sleeved onto a handle 5 of the kitchen utensil 3 so that the pocket portion 40 contains the entire handle 5. As a result, the pot holder 1 of the present invention can be made to wrap around the entire handle 5 to thus provide a reliable protection for the user when holding hot handles 5 of kitchen utensils 3. Moreover, since the pot holder 1 is sized according to the dimension of the pot handles 3, it can properly fit on such handles 5 and be easy to grip without slipping or contaminating food contained in the kitchen utensil 3.

Figure 7A:
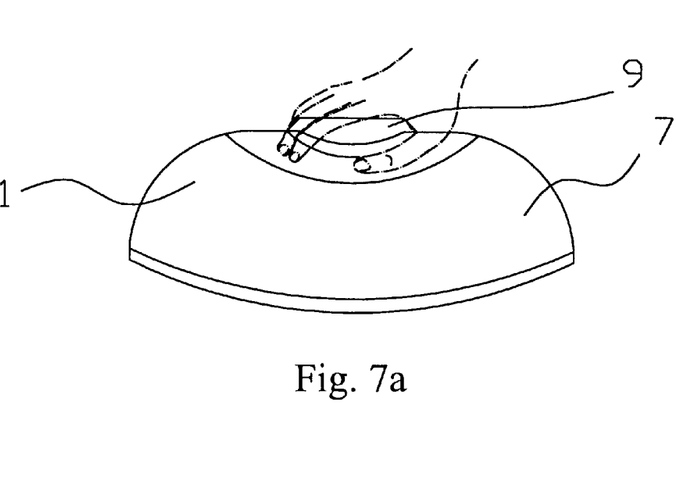
FIGS. 7a and 7b show the pot holder in FIGS. 3c to 3e being used in connection with a pot lid knob.
Figure 7B:
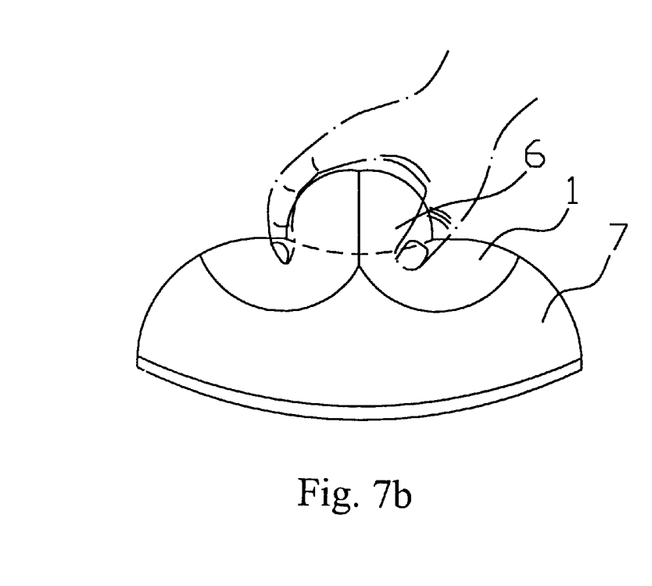

FIGS. 7a and 7b show that the pot holder 1 of the present invention can also be used to handle a knob 9 on a pot lid 7. Similar to the above description, the pot holder 1 can be sleeved onto knob 6 on the pot lid 7 so that the pocket portion 40 contains the entire knob 6. Thereby, the pot holder 1 is also capable of providing reliable protection for a user when handling a hot lid knob 9 of the kitchen utensil 3.

The pot holder 1 of the present invention can be easily washed. It can be hung or put in any desired location in the kitchen. When the pot holder 1 is made of a patterned fabric or configured as various animated shapes, it can provide good living style and artistic flavor to the kitchen.

While the embodiments described herein is at present considered to be preferred, it is understood that various modifications and improvements may be made therein, and it is intended to cover in the appended claims all such modifications an improvements as fall within the true spirit and scope of the invention.

What is claimed is:

1. A pot holder comprising:

first and second panels each being defined by a first edge portion and a second edge portion, each of the two panels having an outer layer, an inner layer and a heat insulating filling member located between the outer layer and the inner layer, the outer layer, the filling member and the inner layer of each panel being connected to one another along at least part of the edge portions; and the first and second panels along their first edge portions being connected by a joining means to form a pocket, the pocket having an opening portion defined by the second edge portions of the two panels, and wherein at least one of the second edge portions of the panels is curved, and one of the second edge portion of the panels extends beyond the other second edge portion thereby to facilitate the user to open said pocket and to sleeve the pocket onto a pot handle.

2. The pot holder of claim 1 wherein at least one of the layers is made of heat resistant materials.

3. The pot holder of claim 2 wherein the inner layer is made of heat resistant materials.

4. The pot holder of claim 1 wherein the inner layer is made of cotton.

5. The pot holder of claim 3 wherein the outer layer comprises a decorative pattern.

6. The pot holder of claim 1 wherein the filling ember is cotton batting.

7. The pot holder of claim 1 wherein the joining means is a continuous stitch seam.

8. The pot holder of claim 1 further comprising a hanging member attached thereon.

9. The pot holder of claim 8 wherein the hanging member is made of the same material as that of the outer layers.

10. The pot holder of claim 9 wherein the hanging member is made o f heat resistant materials.

11. A pot holder comprising:

at least three panels each defined by a first and second lateral edge portions and a transverse edge portion extending between said lateral edge portions; and a first joining means connecting a first lateral edge portion of a first panel to a lateral edge portion of a second panel, a second joining means connecting a second lateral edge portion of said first panel to a lateral edge of a third panel, and a third joining means connecting the remaining lateral edge portions of the second and third panels to form a pocket, the pocket having an opening portion defined by the transverse edge portions of the panels, and wherein said panels form a larger pocket and a larger opening portion so that it is easier for the user to sleeve the pot holder onto a pot handle or a lid knob.

12. The pot holder of claim 11 wherein each panel has an outer layer, an inner layer and a heat insulating filling member located between the outer layer and the inner layer.

13. The pot holder of claim 12 wherein the outer layer, the filling member and the inner layer of each panel are connected to one another along at least part of the edge portions of the panel.

* * * * *